United States Patent [19]

Gates

[11] 3,967,424
[45] July 6, 1976

[54] BOAT WINDOW

[76] Inventor: John I. Gates, 114 Via Mentone, Newport Beach, Calif. 92660

[22] Filed: May 2, 1975

[21] Appl. No.: 573,808

[52] U.S. Cl. ................................. 52/208; 52/510; 52/511
[51] Int. Cl.² ............................................. E06B 3/00
[58] Field of Search ............ 52/624, 613, 614, 629, 52/510, 511, 202, 208, 211, 203, 616, 397, 400, 506

[56] References Cited
UNITED STATES PATENTS 3,228,156  1/1966  Hitzelberger ................... 52/510 X
3,416,833  12/1968  Griffin .............................. 52/208 X Primary Examiner—Ernest R. Purser
Assistant Examiner—Carl D. Friedman
Attorney, Agent, or Firm—Christie, Parker & Hale

[57] ABSTRACT

A window comprises a translucent pane on which is mounted a rigid mounting member for attaching the window to an opening in a boat hull and the like. The mounting member is bent in the shape of the pane, but it is sufficiently smaller so that a mounting flange is defined by the pane itself between the mounting member and the edge of the pane.

9 Claims, 6 Drawing Figures

BOAT WINDOW

BACKGROUND OF THE INVENTION

Traditionally, windows for use in sailboats, motorboats, yachts, camper trailers, house trailers, and the like were fabricated of glass mounted in metal frames. For large boats, such as luxury yachts, the frames are made of brass, stainless steel, or other corrosion resistant metal. These frame materials, however, are quite expensive and their use is not justified in the smaller windows required for sailboats, motorboats, and camper trailers, for example.

In smaller recreational vehicles, such as boats, camper trailers, and the like, the practice was to fabricate the window frames of bent extruded aluminum shapes. Aluminum, however, is susceptible to corrosion, especially in salt atmospheres such as are encountered in marine applications. Corrosion of aluminum window frames may be prevented by painting the frame, but this maintenance effort is not always pursued; also, paint does not adhere readily to aluminum, with the result that where a diligent painting program is pursued the window frames must be repainted frequently.

In an effort to overcome the disadvantages associated with aluminum frames, a window having a frame fabricated of thermoplastic material was introduced commercially for use in small boats. This product has a pane of transparent synthetic resin and a one-piece frame fabricated of vacuum-formed ABS resin to which the pane is bonded. Because the frame is fabricated by vacuum forming techniques, the thickness of the frame material necessarily is relatively thin. Accordingly, these windows flex readily and the bond between the pane and the frame may break in response to such flexing. These windows have the advantage that they are made entirely of synthetic materials which are resistant to corrosion and which can be colored to harmonize with the remaining structure in which they are installed. These windows, because of their one-piece frame construction, are either bonded or screwed to the basic boat structure peripherally of the window opening. Where provided, an interior trim frame is bonded or screwed to the interior of the boat structure for the purpose of ornamentation.

Recently, in an effort to overcome the disadvantages associated with aluminum frames and the disadvantages associated with vacuum formed ABS resin frames, a window having a frame fabricated of extruded rigid vinyl resin was introduced commercially. The extruded resin frame has the rigidity of aluminum shapes and the corrosion resistance of the ABS vacuum formed shapes. This window generally has replaced windows with aluminum or ABS vacuum formed frames in better quality boats.

A problem common to all of these windows which utilize a frame is one of high cost, because these frames are expensive to fabricate and attach to a boat hull. It is much simpler and cheaper to directly bolt plastic sheets to the side of a cabin to form a window. However, even direct bolting has disadvantages, in that the manual labor required for bolting is costly, and the rough edge of the hole in the side of the cabin is unsightly.

The development of some of the newer adhesives, particularly the silicone cements and polysulfide rubbers, has made it possible to cement plastic panes to fiberglass sides rather than by bolting, thereby reducing the installation costs. However, there still remains the problem of the unsightly edge of the window hole in the side of the cabin. In addition, since the sides of boat cabins often flex in use, there is a tendency for the plastic panes to be separated from the boat hull.

Some companies have molded frames directly into the cabin side and have cemented the plastic panes into these frames. However, this involves complex molds and the difficult operation of removing the cabin sides from the molds. Also the edges of the panes have to be beveled, thereby increasing the expense of the window.

SUMMARY OF THE INVENTION

This invention overcomes the disadvantages of existing window designs by providing an inexpensive window for habitable recreational vehicles, small boats, and the like. The window consists of a translucent pane and a mounting member, referred to below as a "fin" fabricated of rigid thermoplastic material. The fin, which is mounted on the pane, extends continuously parallel to the edge of the pane at least about one-fourth inch from the edge of the pane. The fin also extends substantially normal to the surface of the pane for a length about equivalent to the thickness of the wall of the vehicle.

Broadly stated, the invention defined in the following claims is a window for openings in the walls of boats, trailers, and the like. The window comprises a pane and a mounting member. The mounting member extends effectively continuously circumferentially of the pane. The mounting member is disposed a selected distance inwardly of the edge of the pane and is provided for mounting the pane. The mounting member is fabricated of rigid, synthetic thermoplastic material and extends substantially normal to the interior surface of the pane. When the window is mounted in a wall opening, the surface of the pane between the mounting member and the edge of the pane is mounted against the surface of the wall. The mounting member extends into the opening and is mounted against the edge of the opening.

This window is inexpensive to produce, simple and inexpensive to install because holes drilled into the structure to which the window is to be mounted are not required, and gives an aesthetic window since the fin acts as a trim surface to cover the rough fiberglass cut surface on the exterior wall. Also, in the preferred embodiment of the invention, the fin surface facing the end of the pane and normal to the pane surface has grooves, which gives a bond of exceptional strength between the window and the hull.

DESCRIPTION OF THE DRAWINGS

The aforementioned and other features of this invention are more fully presented in the following description. These features are presented with reference to the presently preferred embodiments of the product comprehended by the invention, the description of which is presented with reference to the accompanying drawings wherein.

DESCRIPTION OF THE INVENTION

Figure 1:
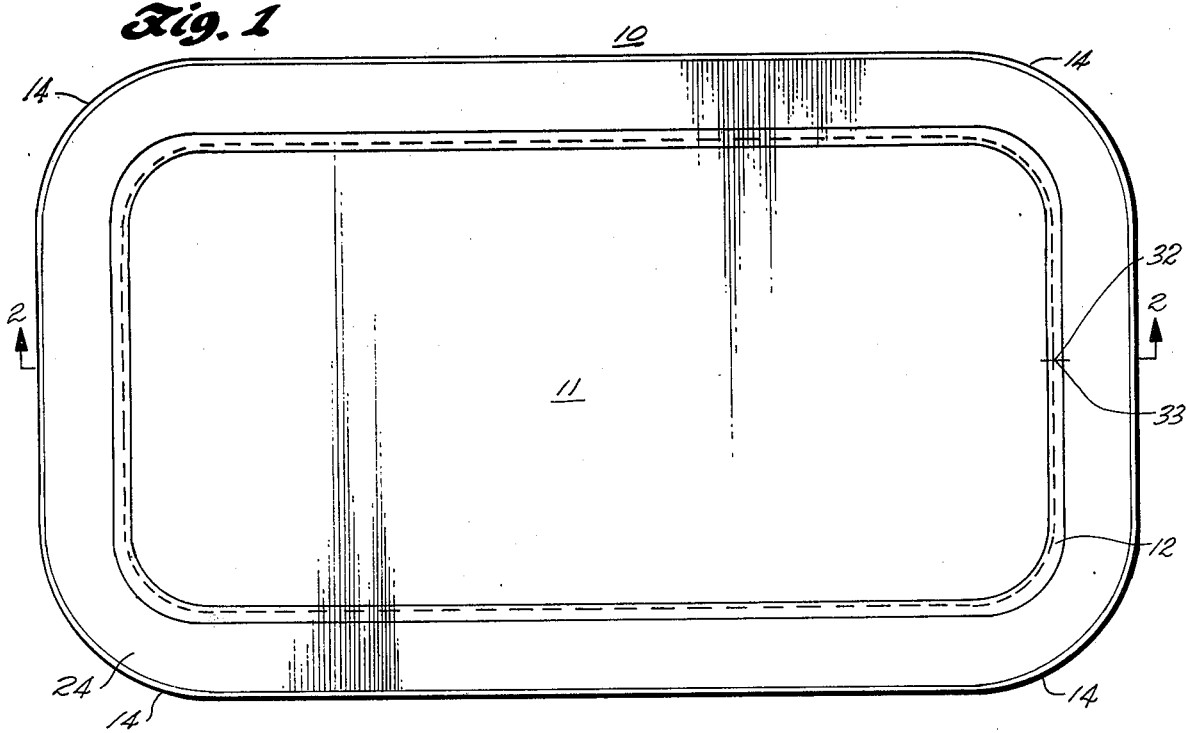
FIG. 1 is an elevation view of the exterior side of the window according to this invention.
Figure 4:
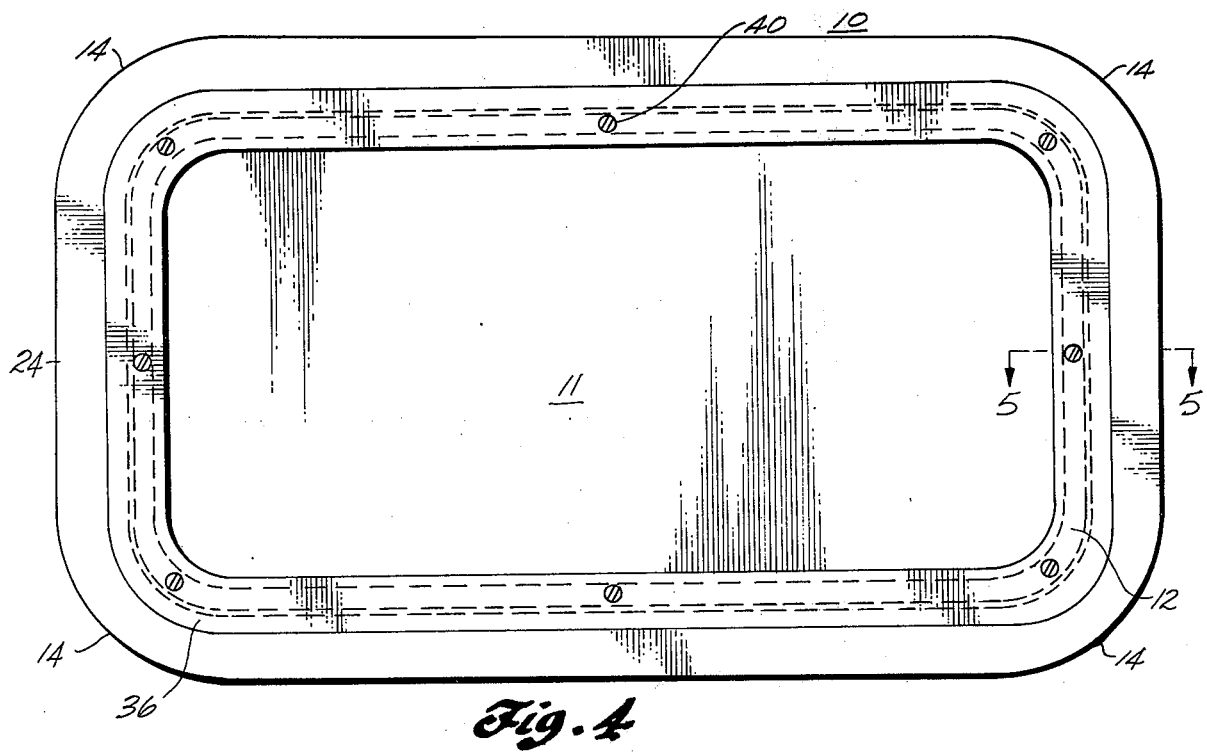
FIG. 4 is an elevation view of the interior side of a window with an interior trim member.
Figure 3:
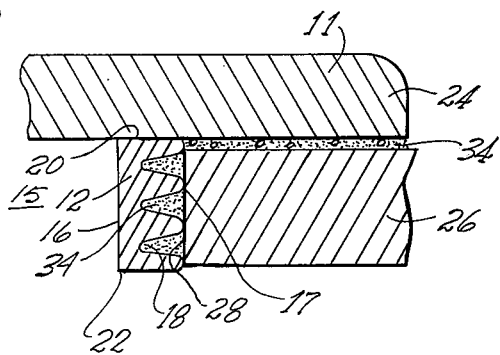
FIG. 3 is an enlarged cross-sectional elevation view through the fin of a window mounted in a window opening.

An exemplary window 10 according to this invention is shown in FIGS. 1 and 4. The window includes a translucent pane 11 and a fin 12 attached to the pane. As used herein the term "translucent" means either transparent or partially opaque as in frosted glass. Window 10 has rounded corners 14 adapting it to be received in a correspondingly configured opening 15, shown in FIG. 3, provided through the wall of the hull or deck house of a small boat.

Pane 11 is made from a flat sheet of strong translucent plastic such as acrylic, methyl methacrylate-styrene copolymer, methyl methacrylate-alpha-methylstyrene copolymer, allyl diglycol carbonate, cellulose propionate, cellulose acetate butyrate, cellulose nitrate, ionomer, phenolic, phenylene oxide, polycarbonate, and styrene. Preferably pane 11 is defined by a piece of acrylic sheet resin whose surface bears an abrasion resistant fluoro carbon coating; such sheet material is marketed by E. I. DuPount deNemours and Company, Wilmington, Del., under the trademark ABCITE. If desired, however, the pane may be made of clear or tinted glass which may be transparent of partially opaque.

The pane may be flat or it may be singly or complexly curved as when the pane is used for a window in the hull of a boat. When the pane is so used, its periphery matches the edges of the opening in the hull, and its surface appears as the material continuation of the curved surface of the hull.

It is preferred that the fin for a window of this invention be fabricated from bent extrusions of synthetic thermoplastic resin. The presently preferred thermoplastic resin from which the fin is fabricated in Geon 8700-A polyvinyl chloride resin obtainable from B. F. Goodrich Chemical Company, 3135 Euclid Avenue, Cleveland, Ohio. This resin is referred to as a "rigid" resin because it has a structural strength exceeding 10,000 psi. Geon 8700-A polyvinyl chloride resin has a structural strength of about 11,500 psi and has a heat distortion temperature at 264 psi of 157°F. (see ASTM Standard Test Method D648-56).

Figure 5:
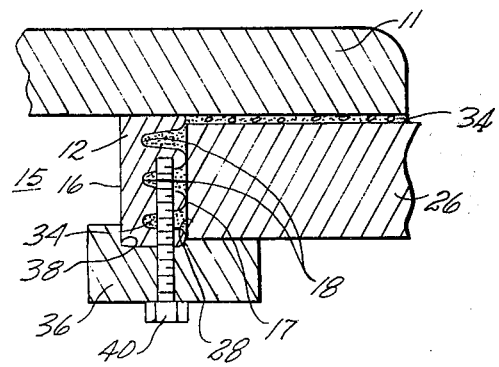
FIG. 5 is an enlarged cross-sectional elevation view taken along line 5—5 in FIG. 4.

As shown in FIGS. 3 and 5, in the preferred embodiment of the invention, fin surface 16 normal to the pane and facing the center of pane 11 is straight while the opposite surface 17 of the fin, the surface facing the end of the pane, has grooves 18 evenly spaced along the depth of the fin normal to the pane. The grooves are of substantial depth in terms of their width and are located between flanges of the fin. The flanges lie parallel to the pane and extend from the fin toward the adjacent periphery of the pane. Preferably, the depth of these grooves is equal to about one-half the width of the fin. The purpose of these grooves is to strengthen the bond between the fin and the hull of the boat by increasing the bonding surface area, since strength of a bond is proportional to bonding surface area.

Figure 2:
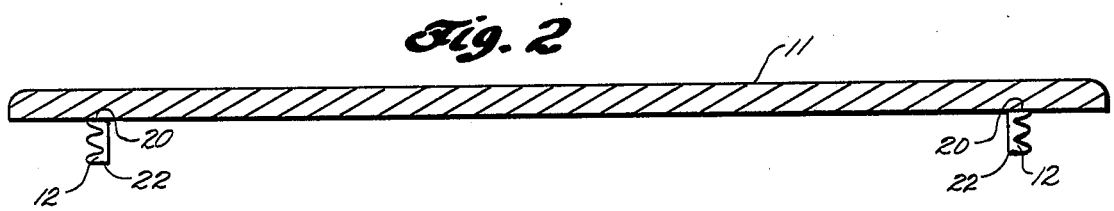
FIG. 2 is a cross-sectional elevation view taken along line 2—2 in FIG. 1.

As shown in FIGS. 2 and 3, the surfaces 20 and 22 of the fin respectively proximate and distal to pane 11, generally are smooth, although grooves may be used on side 20 to increase the strength of the bond between the fin and pane.

Where a glass pane is used in a window according to this invention, it is preferred that the part of the pane which is to be bonded to the fin carry a coating of some resin, such as vinyl butyrate, which adapts the glass for connection to the window frame by solvent bonding processes. For example, a ribbon of vinyl butyrate may be adhered to the glass pane by applying heat and pressure via a tetrafluoroethylene pressure pad which withstands applied heat and does not stick to the vinyl butyrate. Tetrahydrofuran is a suitable solvent for bonding vinyl butyrate to polyvinyl chloride.

As shown in FIG. 1, the fin is bonded along the periphery of the pane about one-fourth inch to about 1 inch from the edge of the pane. As shown in FIG. 3, this peripheral strip 24 of pane between the end of the pane and where the fin is bonded to the pane abutts against the fiberglass wall 26 of a boat hull from which opening 15 is cut.

Fin 12 preferably is provided as a straight extrusion which is bent during manufacture of window 10. The preferred process and preferred apparatus for bending a straight extrusion into the configuration of fin 12 is described in my U.S. Pat. No. 3,868,789, issued on Mar. 4, 1975. The curvature to which fin 12 is bent in manufacture of window 10 is selected so that fin 12 may be passed through window opening 15, as shown in FIG. 3. The perimeter of fin 12 is slightly less that that of opening 15 so that when the fin is inserted through the opening, surface 17 of the fin with grooves 18 is in close proximity to window opening edge surface 28 of wall 26.

According to this preferred process the extrusion is bent first by engaging a major portion of the cross-sectional configuration of the extrusion intimately with a stationary bending die which is cooperatively configured to mate closely with the flat surface of the extrusion and to preserve the cross-sectional configuration thereof during the bending process. The stationary bending die is a very simple mold. As mated with the bending die, the extrusion is heated, preferably by application of a heating fluid directly to the extrusion via the bending die. The extrusion is heated to a temperature which is sufficiently elevated above ambient temperature that the thermoplastic material softens so as to lose a portion, but not all, of its rigid characteristics. That is, the extrusion, over the portion of the length thereof to be bent, is heated to a temperature which causes the thermoplastic material of the extrusion to soften and to lose a portion, but not all, of its tensile strength. Preferably, the temperature to which the extrusion is heated is a temperature which lies between the deflection temperature of the resin at 264 psi and the compression molding temperature for the resin. The bending die defines the curvature to which the extrusion is to be bent. Before the extrusion is actually bent to conform to the curvature of the bending die, a flexible second bending die is engaged with the grooved surface of the extrusion. The flexible second die is then moved toward the first bending die, thereby to move the extrusion into intimate mating engagement with both dies over the length of the extrusion to be bent. The engagement of the extrusion between the bending dies is sufficiently forceful that the cross-sectional configuration of the extrusion is maintained during the bending process. Before the dies are separated from each other, the bent extrusion is cooled sufficiently to restore sufficient tensile strength to the shape so that the bent extrusion can be handled without distortion, and then the bent extrusion is removed from its engagement with the bending dies.

As shown in FIG. 1, fin 12 preferably is formed from one piece of extrusion with opposite ends 32 and 33. To assemble the window, ends 32 and 33 are abutted together and then bonded together.

Once ends 32 and 33 of the fin have been connected, the fin is mounted onto the pane. This mounting is accomplished by any conventional bonding process and preferably is accomplished by a solvent bonding process using a solvent effective upon both the synthetic material from which the fin extrusion is made and the synthetic material from which the pane is fabricated. In those cases where the pane is defined by ABCITE abrasion-resistant acrylic sheet material, it may be necessary to condition the pane in the area where the fin is to be mounted by removing the fluorocarbon abrasion-resistant coating which characterizes this particular pane material. Tetrahydrofuran, especially when applied by a syringe, has been found to be a suitable solvent where acrylic and vinyl resins are to be bonded, i.e., ABCITE and Geon 8700-A. Alternatively, conventional PVC glue may be used, if desired. Solvent bonding is facilitated by using a hypodermic syringe, or the like. A suitable solvent, such as tetrahydrofuran, is placed in the syringe and the needle of the syringe is put into or adjacent to the space between the pane 11 and fin surface 20 proximate to the pane. The solvent is then injected into this space as the needle is drawn through or along the space.

Because of the cross-sectional configuration of the fin, it is apparent that this window does not readily flex, with the result that, in use, the bond between the fin and the pane is maintained.

Window 10 preferably is mounted to hull wall 26 principally by an adhesive 34 such as silicone cement. The preferred mounting procedure involves filling fin grooves 18 to excess with silicone element, and then inserting the window in place in the window opening from the exterior side of the opening. Since the fin registers closely with the window opening, such insertion of the fin into the opening causes the excess cement in the fin grooves to be sheared off by the outer edge of the opening, thereby generating a bead of cement of the hull outer surface around the opening and assuring that the spaces between the fin surface 17 and the window opening edge surface 28 are fully filled with cement. The window is then pressed toward the outer surface of hull 26 to cause the cement in the bead thereof to flow outwardly of the fin and to completely fill the interface between the pane margin (outwardly of the fin) and the outer surface of the hull. The window is so pressed into place for a short time to allow the cement to partially set. Any excess cement of flash around the extreme outer periphery of the hull is scraped away while the cement is only partially set.

When the window is mounted according to the preferred procedure described above, it is not necessary to use any other caulking material in the interface between the pane margin and the hull. Also, silicone cement, even when fully set, possess some resilience which assures that normal flexing of the hull in the vicinity of the installed window does not adversely affect the bond of the cement to the mounting of the window and to the hull. This means that the mounting of the window to the hull is maintained watertight.

As described above, the fin serves to bond the window to the wall and to provide rigidity to the window assembly. The fin also serves as a trim flange on the exterior of the wall to provide an aesthetic cover for the cut fiberglass surface. The assembly as shown in FIG. 1 however, does not cover the cut fiberglass surface on the interior side of the wall. In order to trim the interior an interior trim member 36 may be used, as shown in FIGS. 4 and 5. It is preferred that the interior trim member be fabricated utilizing the same process and the same material as is used for the fin.

Preferably, the interior trim member is attached to window assembly 10 by compressive forces, which are generated between surface 16 of the fin and the adjacent trim member surface 38, as shown in FIG. 5. These compressive forces are generated when the perimeter of the interior trim member along surface 38 is slightly longer than the perimeter along fin surface 16. In other words, a snap fit may be used to connect the trim member 36 to the inner end portion of the fin.

Alternatively, the fin and trim member may be bonded together with cement or a solvent such as tetrahydrofuran, or connected by mechanical means such as a series of screws 40 extending through the interior trim member into the fin via fin surface 22, as shown in FIGS. 3 and 4. As shown in FIG. 3, the screws are provided at evenly spaced locations along the periphery of the window.

Figure 6:
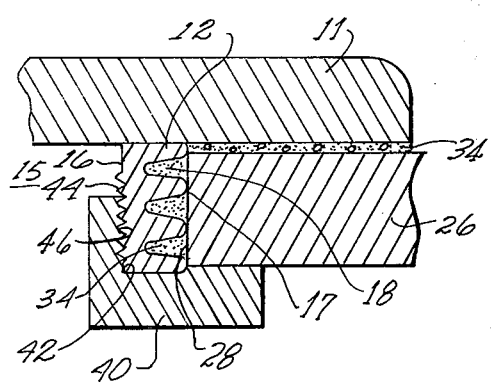
FIG. 6 is an enlarged cross-sectional elevation view through the fin of another window according to this invention, and shows an interior trim member attached to the fin with a series of interlocking serrations.

Another interior trim member 40 is depicted in FIG. 6. Fin interior surface 16 and adjacent trim member face 42 define mating serrations 44 and 46, respectively. The configuration of serrations 44 and 46 prevents disengagement of the fin and trim member.

A complete window 10 of the type shown in FIGS. 1–6 can be mounted to a wall of substantially any thickness encountered merely by varying the depth of the fin.

It is a feature of this invention that the fin and trim member for the window contemplated hereby may be fabricated of a thermoplastic resin which itself defines the color desired for the completed window. Thus, a window according to this invention need not be painted. Also, the thermoplastic materials from which the frames are fabricated are not susceptible of corrosion. In presently preferred windows according to this invention, the fin and trim member for the windows are defined by off-white extruded rigid polyvinyl chloride resin.

It is apparent from the foregoing description that windows according to this invention possess a unique combination of advantages not available from any one competitive window, including low cost, ease of assembly, quick and easy installation, low tooling cost, rigidity, corrosion resistance, and long life in use. Also the window may be provided in any configuration and in any fin and trim color desired.

In the preceding description, reference has been made to extruded rigid polyvinyl chloride resin as a presently preferred material for the window fin and trim member. This material is presently preferred largely because it is readily available at reasonable cost and can be formed easily in the manner described above. Those skilled in the art will readily appreciate that thermoplastic materials other than polyvinyl chloride may be used to provide extrusions for the fins and trim members according to this invention. Thus the invention contemplates the provision of windows having fins and trim members made of bent extrusions made of the following resins, among others:
- acrylonitrile-butadiene-styrene resins
- acetal homopolymers and copolymers
- acrylic resins
- chlorinated polyether resins
- polyvinylidene fluoride resins
- methylpentene polymers
- nylon resins
- polyarylsulfone resins
- polypropylene
- high impact polystyrene
- styrene-butadiene resins
- polysulfone resins
- high density polyurethanes and
- polyethylenes Although the preferred method for forming the fin and trim member is by bending straight extrusions into the desired configuration utilizing the process and apparatus described in my U.S. Pat. 3,868,789, this invention contemplates fins and trim members made by other conventional plastic molding processes, such as injection molding. This invention also contemplates a fin whose surface 18 is without grooves.

What is claimed is:

1. A window for openings in the walls of boats, trailers and the like comprising a pane and a mounting member extending effectively continuously circumferentially of the pane a selected distance inwardly of the edge of the pane and mounting the pane therein, the mounting member being fabricated of rigid synthetic thermoplastic material, such mounting member extending substantially normal to the interior surface of the pane, and wherein when the window is mounted in an opening, the surface of the pane between the mounting member and the edge of the pane is mounted against the surface of the wall, and the mounting member extends into the opening and is mounted against the edge of the opening.

2. A window according to claim 1 wherein the mounting member is fabricated of extruded rigid synthetic thermoplastic material.

3. A window according to claim 1 wherein the thermoplastic material is polyvinyl chloride.

4. A window according to claim 1 wherein the mounting member surface normal to the surface of the pane and facing the periphery of the pane has two or more grooves substantially parallel to the surface of the pane.

5. A window according to claim 1 wherein the means for mounting the mounting member on the pane is solvent bonding.

6. A window according to claim 1 wherein the window is secured to the window opening in said wall with an adhesive.

7. A window according to claim 1 wherein said selected distance is at least about one-fourth inch.

8. A window according to claim 1 wherein said mounting member extends substantially normal to the interior surface of the wall for a distance about equivalent to the thickness of said wall.

9. A window for an opening in the walls of boats, trailers and the like comprising:
 a. a pane;
 b. a mounting member extending effectively continuously circumferentially of the pane a selected distance inwardly of the edge of the pane and mounting the pane therein, the mounting member being fabricated of rigid thermoplastic material, such mounting member extending substantially normal to the interior surface of the pane, and wherein when the window is mounted in an opening, the surface of the pane between the mounting member and the edge of the pane abuts against the surface of the wall and the mounting member extends through the opening and is mounted against the edge of the opening; and
 c. an interior trim member adapted for connection to the mounting member to cover the mounting member and the structure defining the opening in which the window is mounted in use.

* * * * *